Figure 1:
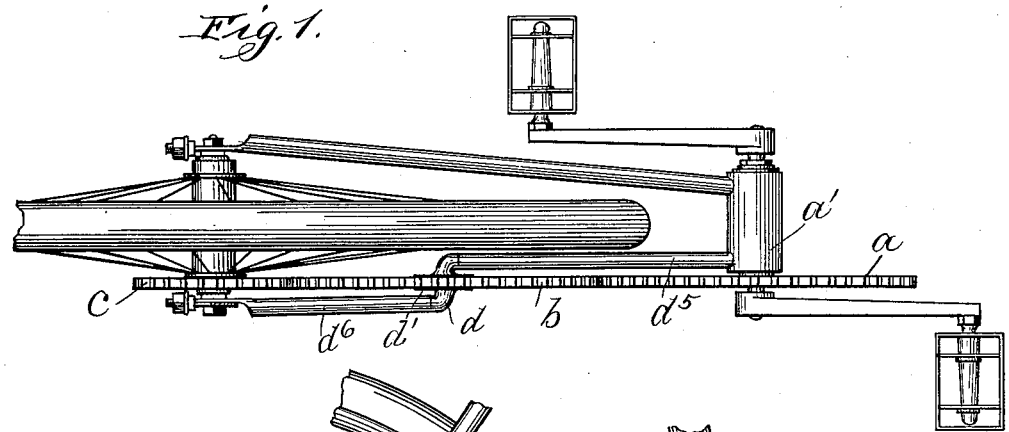

No. 607,522. Patented July 19, 1898.
LA VERNE W. NOYES.
BICYCLE DRIVING GEAR.
(Application filed Aug. 5, 1897.)

(No Model.)

Witnesses:
R. J. Jacker.
M. R. Rochford.

Inventor:
La Verne W. Noyes
By Ludington & Jones
Attorneys.

UNITED STATES PATENT OFFICE.

LA VERNE W. NOYES, OF CHICAGO, ILLINOIS.

BICYCLE DRIVING-GEAR.

SPECIFICATION forming part of Letters Patent No. 607,522, dated July 19, 1898.

Application filed August 5, 1897. Serial No. 647,170. (No model.)

*To all whom it may concern:*

Be it known that I, LA VERNE W. NOYES, a citizen of the United States, residing at Chicago, in the county of Cook and State of Illinois, have invented a certain new and useful Improvement in Bicycle Driving - Gear, of which the following is a full, clear, concise, and exact description, reference being had to the accompanying drawings, forming a part of this specification.

My invention relates to a driving-gear for bicycles, my object being to provide an improved gear which will dispense with the use of a driving-chain, which will be effective in operation, and which can be manufactured at small cost.

In practicing my invention I provide an intermediate gear-wheel between the gear-wheel on the crank-shaft and the pinion on the axle of the rear or driving wheel, whereby motion is transmitted from the crank-shaft to the rear wheel without the intervention of a driving-chain. In order to provide an effective bearing for the intermediate gear-wheel, I construct the bracing tube or rod, hereinafter termed the "brace-rod," extending from the hanger-barrel to the rear wheel, with a laterally-extending portion at an intermediate point in the length thereof, to thereby constitute a lateral bearing for the intermediate gear having the requisite strength and without materially affecting the strength and utility of the brace-rod. I preferably construct the brace-rod by providing a forging carrying a peripheral groove for the balls of the bearing and having the ends extending in opposite directions and brazed or otherwise secured to the tubes or rods extending, respectively, to the hanger-barrel and the axle of the rear wheel. The bearing portion of the forging is arranged with a larger diameter than the tubes or rods, so that the gear-wheel may be readily passed over the end of one of the tubes or rods and moved to the desired position wherein it surrounds the bearing. The gear-wheel is provided with a removable cap or otherwise constructed, so that the balls may be placed in position after the gear-wheel has been placed upon the bearing. A ball-bearing comprising a single row of balls between the wheel and the bearing is preferably employed.

I am aware that it has been proposed heretofore to employ intermediate gear-wheels between a gear-wheel on the crank-shaft and a gear-wheel on the rear axle, and I do not claim such features broadly, but in combination with the subject-matter specifically set forth in the claims.

I have illustrated my invention in the accompanying drawings, in which—

Figure 2:
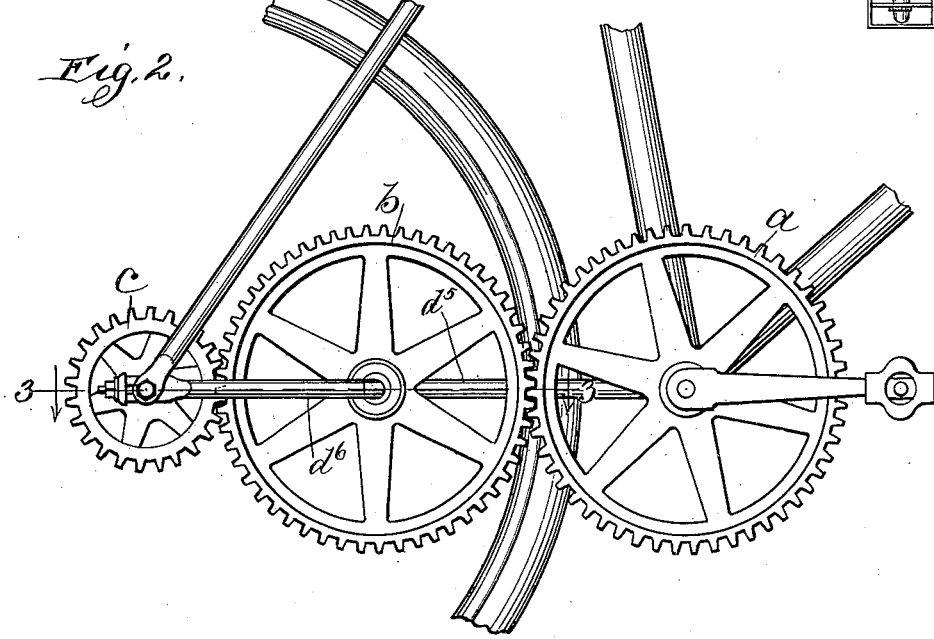
Figure 3:
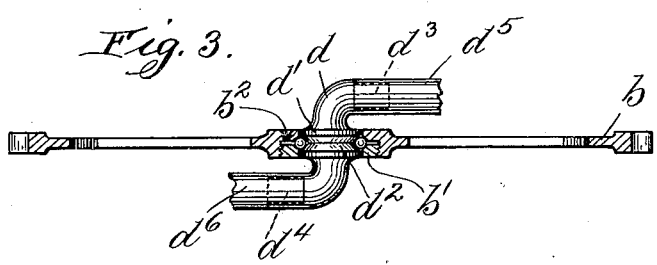

Figure 1 is a plan view of the driving-gear of my invention. Fig. 2 is a view thereof in elevation. Fig. 3 is a detail view of the lateral bearing.

Like letters refer to like parts in the several figures.

Upon the crank-shaft is provided a gear-wheel $a$, meshing with the intermediate gear-wheel $b$, which in turn meshes with the pinion $c$, carried on the axle of the rear or driving wheel. The brace-tube is formed in three parts. The forging or casting $d$ has an enlarged cylindrical portion $d'$, carrying a peripheral groove $d^2$ and having the ends $d^3$ $d^4$ of decreased diameter and brazed or otherwise secured to the respective tubes or rods $d^5$ $d^6$, one of which extends to the hanger-barrel $a'$, to which it is secured, while the other extends rearwardly and is secured to the rear axle. The gear-wheel $b$ is provided with a removable and adjustable nut or part $b'$, between which and the remainder of the wheel is provided a groove for the balls of the bearing. By this construction the gear-wheel may be readily passed over the end of one of the tubes or rods $d^5$ $d^6$ and moved to the position wherein it encircles the bearing $d'$, after which the balls of the bearing may be placed in position and the nut $b'$ screwed in to properly adjust the bearing. The nut $b'$ may be held in position and against working loose in any desired manner—as, for instance, by the provision of a set-screw $b^2$, adapted to be screwed against the face thereof.

Having described my invention, what I claim as new, and desire to secure by Letters Patent, is—

1. In a bicycle, the combination with the gear-wheels on the crank-hanger and the rear axle, of an intermediate gear-wheel meshing therewith, and a brace-rod extending between said crank-hanger and said rear axle and consisting of a front tube on the inside and a rear tube on the outside of the intermediate wheel and a forging having a transverse bearing portion and having the end portions bent respectively forward and rearward and fitting in the hollow ends or bores of said front and rear tubes respectively and secured therein to form a continuous brace-rod possessing lateral and longitudinal rigidity, substantially as described.

2. In a bicycle, the combination with a forging or casting having an intermediate portion of enlarged diameter and end portions of smaller diameter extending respectively in opposite directions and at right angles to said intermediate portion, of a pair of bracing tubes or rods in the ends of which said end portions are brazed or otherwise secured and a wheel having a bore of a diameter to permit the same to be placed upon the intermediate portion of said casting or forging by passing the same over and along the rear bracing-tube, said rear tube being detachably secured to the rear axle and to the upper rear frame-bar; substantially as described.

In witness whereof I have hereunto subscribed my name in the presence of two witnesses.

LA VERNE W. NOYES.

Witnesses:
P. BIRD PRICE,
W. CLYDE JONES.